United States Patent
Keller et al.

(10) Patent No.: US 8,737,788 B2
(45) Date of Patent: May 27, 2014

(54) FIBER OPTIC CABLE DESIGN WITH IMPROVED COMPRESSION TEST RESULTS

(75) Inventors: David Keller, Cary, NC (US); Randie Yoder, Garner, NC (US); Dan Rouse, Apex, NC (US); Chris Raynor, Holly Springs, NC (US); Woody Rhodes, Benson, NC (US)

(73) Assignee: Nexans, Paris (FR)

( * ) Notice: Subject to any disclaimer, the term of this patent is extended or adjusted under 35 U.S.C. 154(b) by 610 days.

(21) Appl. No.: 12/290,120

(22) Filed: Oct. 27, 2008

(65) Prior Publication Data

US 2009/0129733 A1 May 21, 2009

Related U.S. Application Data

(60) Provisional application No. 61/001,517, filed on Nov. 1, 2007.

(51) Int. Cl.
G02B 6/44 (2006.01)
(52) U.S. Cl.
USPC .......................................... 385/104
(58) Field of Classification Search
USPC ........................................ 385/102, 103, 104
See application file for complete search history.

(56) References Cited

U.S. PATENT DOCUMENTS

| | | | |
|---|---|---|---|
| 4,269,024 A * | 5/1981 | Ashpole et al. ................. | 57/232 |
| 4,408,088 A | 10/1983 | Foote | |
| 5,390,273 A | 2/1995 | Rahman et al. | |
| 5,408,562 A | 4/1995 | Yoshizawa et al. | |
| 6,160,938 A * | 12/2000 | Little, Jr. ..................... | 385/104 |
| 6,178,278 B1 | 1/2001 | Keller et al. | |
| 6,389,204 B1 | 5/2002 | Hurley | |
| 6,775,444 B1 * | 8/2004 | Hurley ........................ | 385/104 |
| 7,242,831 B2 | 7/2007 | Fee | |
| 2002/0181906 A1 | 12/2002 | Hurley et al. | |
| 2003/0118296 A1 | 6/2003 | Smith | |
| 2003/0138225 A1 | 7/2003 | Lee | |
| 2003/0202757 A1 | 10/2003 | Um et al. | |
| 2003/0206704 A1 * | 11/2003 | Lee et al. ..................... | 385/103 |
| 2005/0013573 A1 | 1/2005 | Lochkovic | |

FOREIGN PATENT DOCUMENTS

| | | |
|---|---|---|
| EP | 0916980 | 5/1999 |
| EP | 1223448 | 7/2002 |
| EP | 1331501 A2 * | 7/2003 |
| EP | 1890175 | 2/2008 |
| EP | 1916554 | 4/2008 |

OTHER PUBLICATIONS

European Search Report dated May 18, 2009.

* cited by examiner

*Primary Examiner* — Michelle R Connelly
(74) *Attorney, Agent, or Firm* — Sofer & Haroun, LLP

(57) ABSTRACT

A multi-tight buffer fiber optic cable includes a first layer of tight buffer optical fibers and at least one second layer of tight buffer optical fibers surrounding the first layer of tight buffer optical fibers. A jacket surrounds the at least one second layer of tight buffer optical fibers, where the first layer of tight buffer optical fibers and the at least one second layer of tight buffer optical fibers are helically wound, and where the at least one second layer of tight buffer optical fibers are helically wound in the same direction as the first layer of tight buffer optical fibers and at substantially the same lay length.

11 Claims, 4 Drawing Sheets

FIBER OPTIC CABLE DESIGN WITH IMPROVED COMPRESSION TEST RESULTS

RELATED APPLICATION

This application claims the benefit of priority from U.S. Provisional Patent Application No. 61/001,517, filed on Nov. 1, 2007, the entirety of which is incorporated by reference.

FIELD OF THE INVENTION

This application relates to fiber optics. More particularly, the present invention relates to fiber optic cable design.

BACKGROUND

Fiber optics are typically constructed as either basic UV coated fibers (typically 250 micron diameter) or tight buffer coated fiber (typically 900 micron outer diameter). Tight buffer optical fibers are used in many cases where a stand alone optical fiber is desired because the fiber is protected by the tight buffer layer. Many times these tight buffer fibers are bundled into a larger cable, such as a 24 fiber cable, so that many tight buffer fibers can be run together to various locations within an installation.

Such multi-tight buffer fiber cables are constructed of a number of components including a coated central strength member, a first tight buffer fiber optic layer, a second tight buffer fiber optic layer, a layer of aramid yarns and an outer polymer jacket. Such an arrangement is shown in prior art FIG. 1.

In these prior art arrangements, although many tight buffer fiber optic elements are positioned within a single cable with sufficient strength for pulling in the longitudinal direction, such cables are also frequently required to past compression tests to make sure that environmental pressures that cables may be exposed to, do not impinge light passing through the fibers contained therein.

Such compression tests typically pass a portion of cable between two compression plates and apply a pressure of approximately 225-250 lbs load across a 4" inch longitudinal length of cable (or 100-110 N/cm). A typical compression test for such cables is EIA FOTP 41A (Electronic Industries Alliance—Fiber Optic Testing Procedures).

As shown in Prior art FIG. 2, when the prior art multi-tight buffer fiber optic cables is compressed under such tests, cross-over stress points between fibers in the lower layer and the upper layer, typically result in cables of this design not achieving a 100% pass rate.

OBJECTS AND SUMMARY

The present invention looks to overcome the drawbacks associated with the prior art and provides a multi-tight buffer fiber optic cable that has an improved pass rate for compression testing over prior art cable designs.

This is achieved by providing a new cable component arrangement within the outer jacket that reduces stresses on the fibers within the cable when external pressure is applied.

In a first arrangement, the central strength member is constructed of a softer and more flexible material.

In a second arrangement, the outer jacket of the cable may be increased in thickness.

In a third arrangement, the aramid strength fibers may be interspersed between each of the components, including between the central strength member and the lower tight buffer optics layer, between each of the tight buffer optics layers, and between the upper tight buffer optics layer and the inner surface of the outer jacket.

In a fourth arrangement, the layers of tight buffer optic fibers are cabled around the central strength member in a uni-directional lay and at substantially equal laylenghts to promote nesting of the layers within one another to avoid individual fiber cross-over stress points.

It is understood that each of the structural arrangements of the components of the cable may be applied in various combinations with one another within a cable to achieve the affects of present invention fiber optic cable.

To this end, the present invention provides for a multi-tight buffer fiber optic cable having a first layer of tight buffer optical fibers, at least one second layer of tight buffer optical fibers surrounding the first layer, and a jacket surrounding the second layer. The first layer and the second layer are helically wound in the same direction and at substantially the same lay length.

BRIEF DESCRIPTION OF THE DRAWINGS

The present invention can be best understood through the following description and accompanying drawings, wherein.

DETAILED DESCRIPTION

Figure 3:
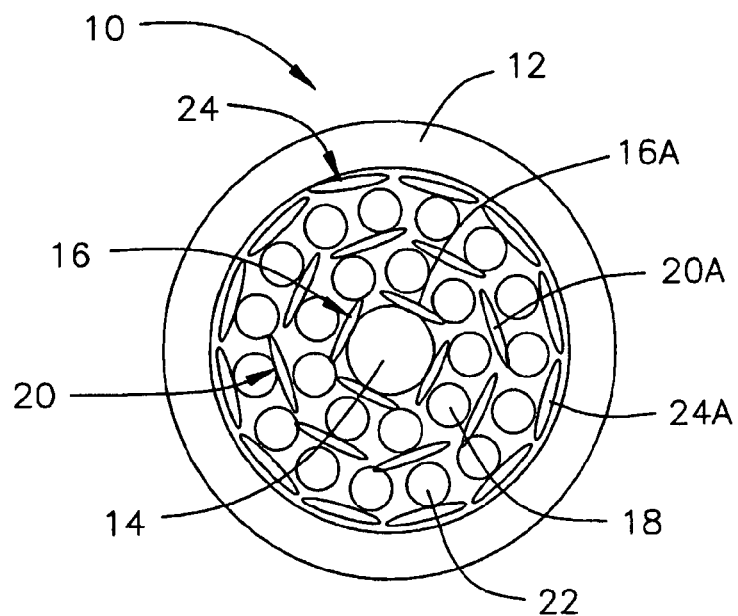
FIGS. 3 and 3B are multi-tight buffer fiber optic cable, according to one embodiment of the present invention.

In one arrangement of the present invention as illustrated in FIG. 3, a fiber optic cable 10 is shown in cross-section. Cable 10 includes an outer jacket 12, a central strength member 14 a first layer of aramid yarns 16, a first layer of tight buffer fiber optics 18, a second layer of aramid yarns 20, a second layer of tight buffer fiber optics 22, and a third layer of aramid yarns 24.

Figure 3B:
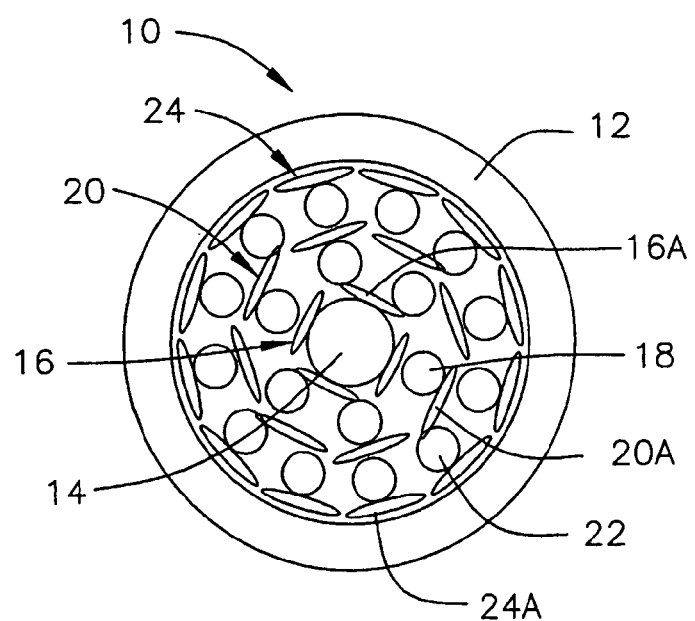

It is understood that the general construction of cable 10 is shown in the above arrangement, illustrated in FIG. 3, where first layer of fiber optics 18 includes nine tight buffered fibers and second layer of fiber optics 22 includes fifteen tight buffered fibers, forming a 24 fiber cable 10. However, it is understood that the salient features of the present invention described below, may be applicable to larger and smaller cables 10, having differing total quantities of tight buffer fibers. For example, as shown in FIG. 3B a similar arrangement may be employed in a 18 fiber cable with six inner layer tight buffer fibers and 12 outer layer tight buffer fibers. The 24 fiber cable 10 as shown in FIG. 3 is used through as an exemplary cable.

Outer jacket 12 is typically made from an extruded polymer, such as FRPVC (Flame Retardant Polyvinylchloride) having a fire rating of UL 262 (Plenum) or UL 1666 (Riser) or PVDF (Polyvinylidene). Jacket 12 is preferably constructed having a thickness of 0.05", a 20-33% increased thickness over the typical jackets (usually 0.04" for FRPVC and 0.03" for PVDF) used in multi-tight buffer fiber cables.

Central strength member 14 is typically a coated (with FRPVC) aramid as opposed to GRP (Glass Reinforced Plastic). Such a strength member 14 is softer and more flexible than those used in prior art in multi-tight buffer fiber cables which typically employ central strength members constructed of GRP or other stiff central strength members.

For example, a soft plastic coating over a soft yarn like aramid used for central strength member 14 is flexible and requires about 6 grams of force to deflect a 2 inch length to an angle of 30 degrees, whereas a coating of FRPVC over a GRP requires approximately 30 grams of force to deflect the same 2 inch length to an angle of 30 degrees. Furthermore, in this above example, such a prior art GRP central strength member, within the coating, is 0.036" in diameter, which is relatively small relative to GRP(s). As the diameter is increased in prior art GRP central strength members, the stiffness would increase exponentially, whereas the softer central strength member of the present invention, such as a coated aramid could be more increased in diameter with lesser effect, further increasing the relative differences in rigidity.

Araimd yarn layers 16, 20 and 24 are each constructed of a plurality of aramid yarns 16a, 20a and 24a. Yarns 16a, 20a and 24a are typically round yarns made of about 1000 individual filaments, but, as shown in FIG. 3 they tend to flatten out during the cabling process into flattened ovals or other confirming shapes, forming layers 16, 20 and 24. Yarns 16a, 20a and 24a are preferably 1500 denier aramid yarns.

Figure 1:
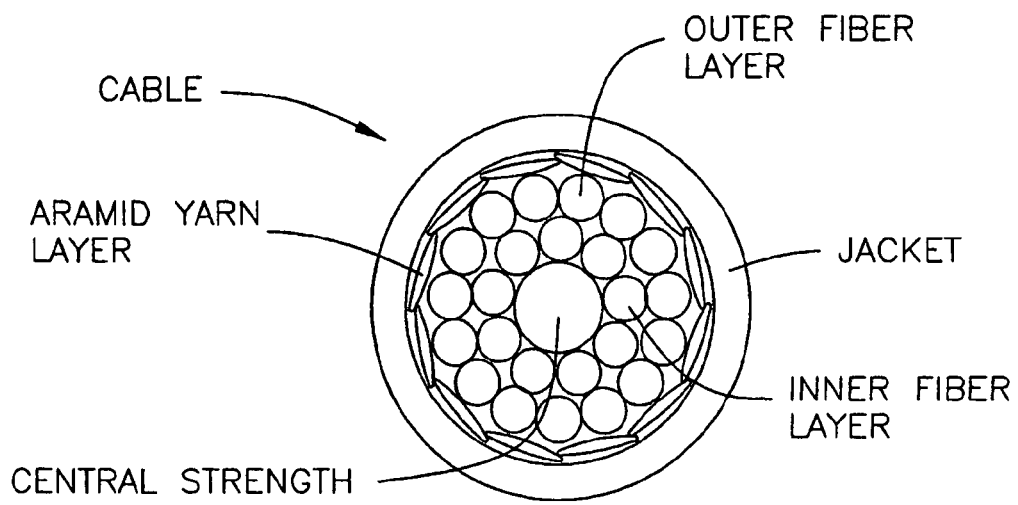
FIG. 1 is a prior art multi-tight buffer fiber optic cable.
Figure 2:
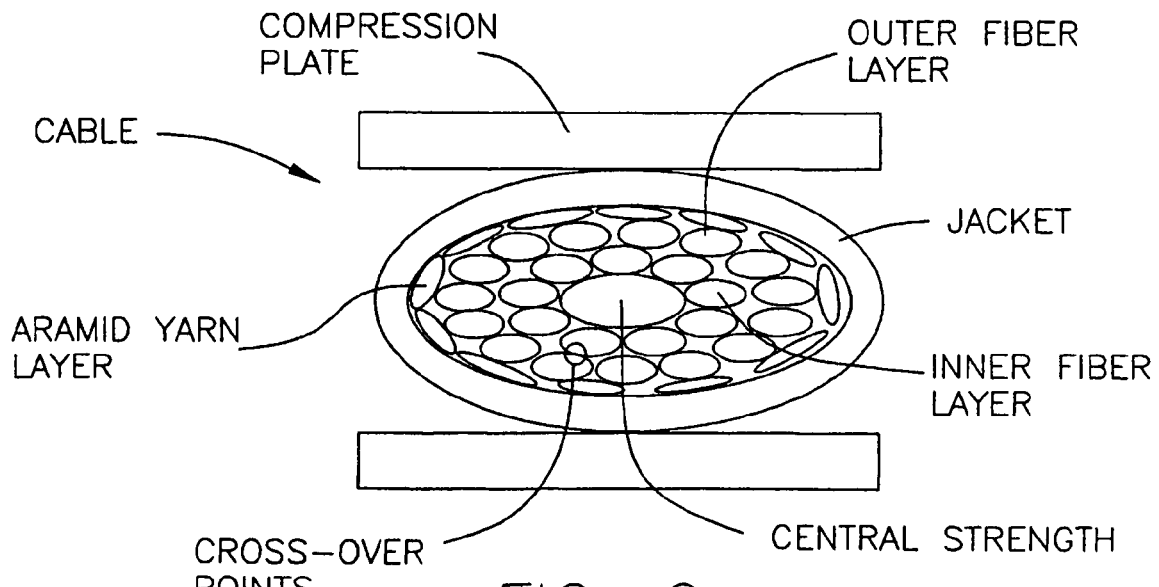
FIG. 2 shows the prior art multi-tight buffer fiber optic cable under a compression test.

Yarn layers 16, 20 and 24, as shown in FIG. 3 are layered in between tight buffer fiber optic layers 18 and 22 as well as between the respective layers and other components of cable 10 such as jacket 12 and central strength member 14. This layering is arranged during the cabling step as the various components are brought together just before extrusion of jacket 12. Such an arrangement is advantageous over prior art multi-tight buffer fiber cables (FIG. 1) where the aramid yarns are included around the outside of the layers of the fiber optic elements. By interspersing the aramid yarn layers 16,20 and 24 between fiber optic layers 18 and 22 and between layer 18 and central strength member 14 and between layer 22 and outer jacket 12, the aramid yarns help to diffuse compression pressures across the totality of layers 18 and 22 without pinching against any one of the fibers within the layers.

Figure 4:
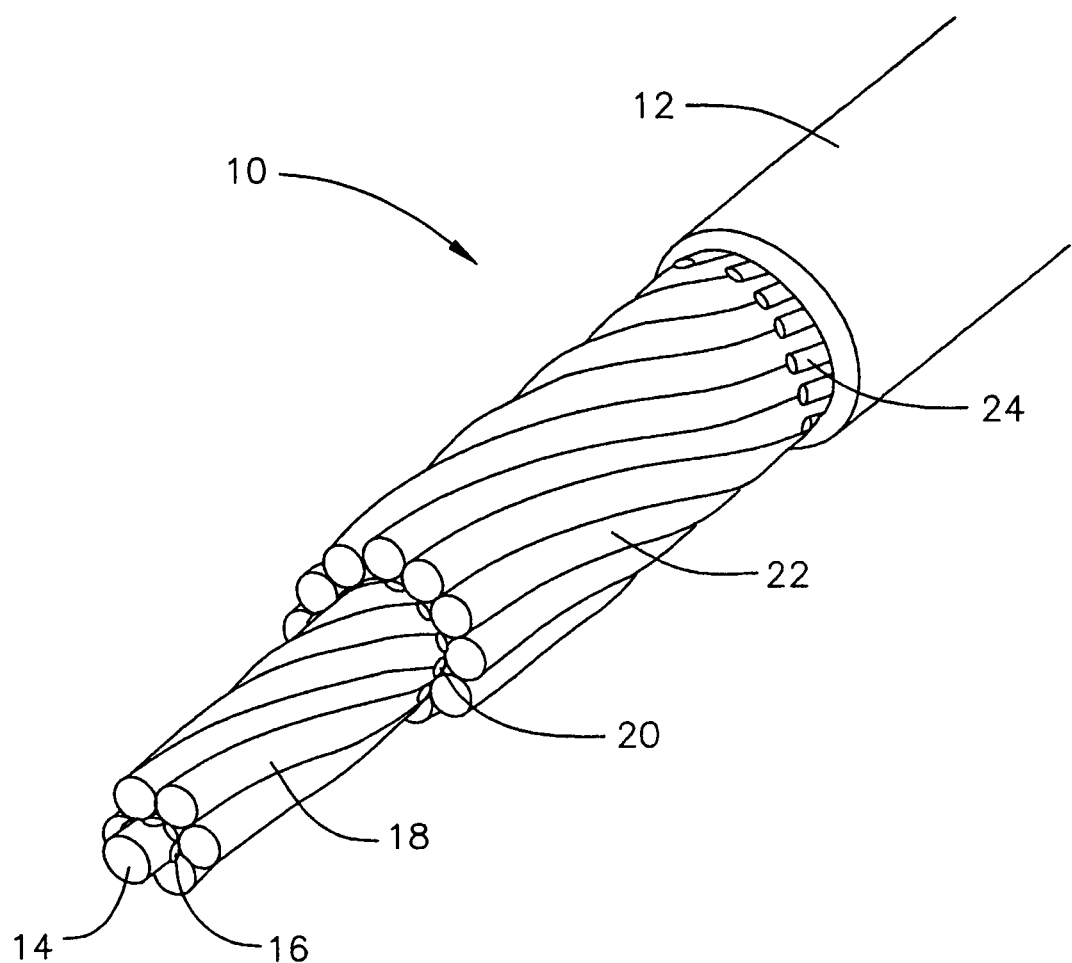
FIG. 4 shows a longitudinal perspective view of the multi-tight buffer fiber optic cable of FIG. 3, with the jacket removed, according to one embodiment of the present invention.
Figure 5:
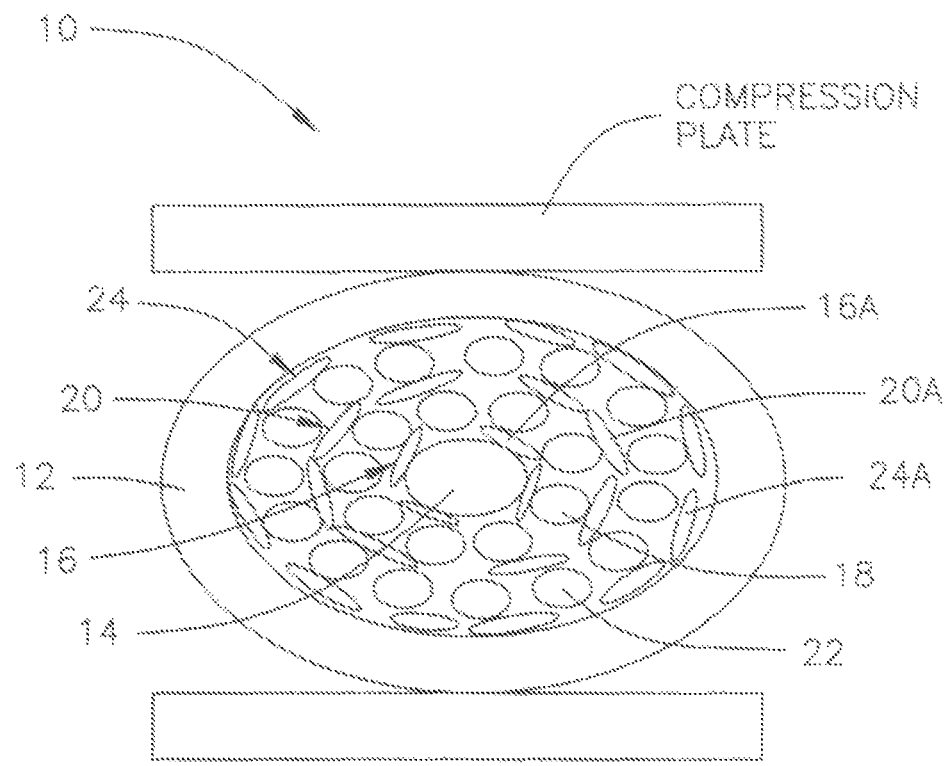
FIG. 5 shows the multi-tight buffer fiber optic cable of FIG. 3 under a compression test, according to one embodiment of the present invention.

In another embodiment of the present invention, as shown in FIGS. 3 and 4, layers of tight buffer fibers 18 and 22 are helically wound (or cabled) around central strength member 14. It is known that cabling of the tight buffer fibers from layers 18 and 22 around the central strength member 14 is useful to provide the cable with installation sturdiness and ability to bend during installation without causing too-great a differential between individual fiber elements within the cable.

However, as described in the background, cabled layers of tight buffer fiber optic elements in the prior art result in cross over points, or points where individual fibers from one layer cross-over another fiber from a different layer. These crossover points are points of weakness under compression tests, leading to increased failures.

The present invention addresses this issue by arranging both first layer of fiber optic elements 18 and second layer of fiber optic elements 22 in a unidirectional lay having substantially the same lay length. As shown in FIG. 4, the tight buffered fiber optic elements of layer 18 have a right handed helical twist around central strength member 14. Likewise, the tight buffered fiber optic elements of layer 22 also have a right handed helical twist around central strength member 14. The rate of twisting for each of layers 18 and 22 is preferably 10" to 20" but may be shorter to lay lengths ranging from 6" to 8", depending o on mechanical considerations of the extrusions/strander equipment and depending on the fiber types being used, however other lay lengths may be used, provided that they are substantially the same for fibers layers 18 and 22. Longer lay lengths of 10" to 20" are preferable for crush resistance because of such lay lengths offer greater parallel assembly alignment under potential crushing objects, including the plates used in crush resistance testing.

It is understood that the tight buffer optical fibers of layers 18 and 22 may be cabled at different lay lengths and in different helical patterns, provided that the lay length and direction are substantially the same between layers.

By assembling layers 18 and 22, the arrangement promotes nesting of fibers within one layer within the fibers within the adjacent layer when cable 10 is under a compression test, avoiding crossing of any component within any layer.

In another embodiment of the present invention, as shown in Figure the yarn layers 16, 20 and 24, described above, are cabled with the tight buffer fibers of layer 18 and 22, with substantially the same lay length and direction as the tight buffer fibers under or over the tight buffers to allow yarns 16a, 20a and 24a to nest in the cracks between the tight buffer fibers of layers 18 and 22.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A multi-tight buffer fiber optic cable comprising:
a first layer of tight buffer optical fibers;
at least one second layer of tight buffer optical fibers surrounding said first layer of tight buffer optical fibers;
a jacket surrounding said at least one second layer of tight buffer optical fibers, wherein said first layer of tight buffer optical fibers and said at least one second layer of tight buffer optical fibers are helically wound in a unidirectional lay and wherein said at least one second layer of tight buffer optical fibers are helically wound in the same direction as said first layer of tight buffer optical fibers and at substantially the same lay length;
at least one first layer of aramid yarns between said first layer of tight buffer optical fibers and said at least one second layer of tight buffer optical fibers, wherein said first layer of aramid yarns are wound in the same direction and at substantially the same lay length as said first layer of tight buffer optical fibers and said at least one second layer of tight buffer optical fibers and wherein said first layer of aramid yarns nests within the openings between said tight buffer optical fibers of said first layer and said tight buffer optical fibers of said second layer, such that with said first layer of aramid yarns being wound in the same direction and at substantially the same lay length as said first and second layers of tight buffer optical fibers combined with said nesting of said first layer of aramid yarns within the openings between said tight buffer optical fibers of said first and second layers, said aramid yarns of said first layer are prevented from crossing over any of said tight buffer optical fibers in said first and second layers and also prevent said tight buffer optical fibers of said first and second layers from crossing over so as not to cause any attenuation during compression or tension on said cable; and
at least one second layer of aramid yarns between said second layer of tight optical fibers and said jacket, wherein said second layer of aramid yarns are cabled with substantially the same lay length and direction as said at least one second layer of tight buffer optical fibers.

2. The multi-tight buffer fiber optic cable of claim 1, further comprising a central strength member, around which said first layer of tight buffer optical fibers are helically wound.

3. The multi-tight buffer fiber optic cable of claim 2, further comprising at least a third layer of aramid yarns between said first layer of tight buffer optical fibers and said central strength member.

4. The multi-tight buffer fiber optic cable of claim 3, wherein said third layer of aramid yarns are wound in the same direction and at substantially the same lay length as said first layer of tight buffer optical fibers.

5. The multi-tight buffer fiber optic cable of claim 3, wherein said second aramid yarn layer is formed with 1500 denier strength aramid yarns.

6. The multi-tight buffer fiber optic cable of claim 1, wherein the thickness of said jacket is substantially 0.0541 inches.

7. The multi-tight buffer fiber optic cable of claim 1, wherein said first layer of tight buffer optical fibers includes nine tight buffer fiber optics and said second layer of tight buffer optical fibers includes fifteen tight buffer fiber optics forming a twenty four tight buffer fiber optic cable.

8. The multi-tight buffer fiber optic cable of claim 1, wherein said first layer of tight buffer optical fibers includes six tight buffer fiber optics and said second layer of tight buffer optical fibers includes twelve tight buffer fiber optics forming a eighteen tight buffer fiber optic cable.

9. The multi-tight buffer fiber optic cable of claim 1, wherein said first aramid yarn layer is formed with 1500 denier strength aramid yarns.

10. The multi-light buffer fiber optic cable of claim 1, wherein said third aramid yarn layer is formed with 1500 denier strength aramid yarns.

11. The multi-tight buffer fiber optic cable of claim 1, wherein said cable, so constructed, achieves 100% pass rate under the compression test of EIA-FOTP-41A.

* * * * *